Dec. 2, 1958 D. K. HART 2,862,482
INTERNAL COMBUSTION ENGINE
Filed Sept. 7, 1949
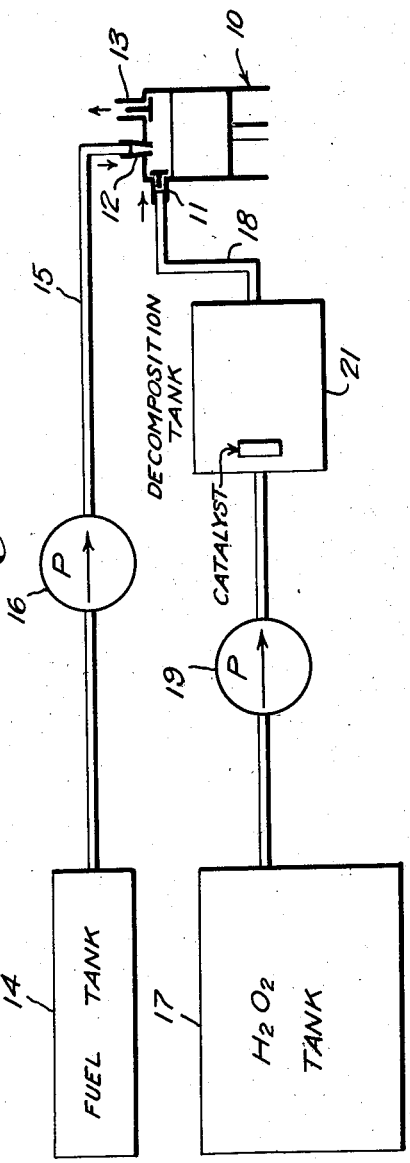
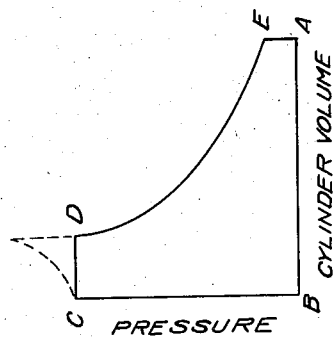
Inventor
D. K. Hart

United States Patent Office 2,862,482
Patented Dec. 2, 1958

2,862,482

INTERNAL COMBUSTION ENGINE

David Kennedy Hart, Berwyn, Md.

Application September 7, 1949, Serial No. 114,447

2 Claims. (Cl. 123—25)

(Granted under Title 35, U. S. Code (1952), sec. 266)

The present invention relates to internal combustion engines. More particularly the invention resides in a method of supporting combustion in an internal combustion engine where access to the atmosphere is not feasible such, for example, as when an internal combustion engine is employed in a torpedo.

Prior art engines of the foregoing type employ an external combustion chamber in which the fuel and oxidant are mixed, the firing of the fuel taking place in the external combustion chamber with accompanying loss of power through dissipation of heat in the chamber and in the manifold as the products of combustion pass from the chamber into the cylinder of the engine. It is also particularly detrimental to the long life of intake valves employed in the engine to fire the mixture prior to its entry into the cylinder of the engine.

The method of the present invention avoids the disadvantages of the prior art engines by bringing the fuel and the oxidant into the cylinder of the engine by separate paths, the oxidant being catalyst activated prior to entry into the cylinder, mixing the fuel and oxidant in the cylinder, and utilizing the temperature developed by the decomposition of the oxidant to ignite the fuel in the engine cylinder. It will thus be seen that the combustion of the gases takes place entirely within the cylinder of the engine with a more direct utilization of the power produced thereby. By utilizing the heat developed by the decomposition of the oxidant for the aforementioned purpose of igniting the fuel, ignition apparatus as employed in conventional engines is eliminated.

An object of the present invention is to provide a new and improved method whereby more efficient utilization of a mixture of fuel and a liquid or solid oxidant in an internal combustion engine is obtained.

Another object of the invention is to provide a method whereby the heat developed by decomposition of the oxidant employed for supporting combustion of the fuel is utilized to ignite the fuel mixture.

A further object is to provide a new and improved internal combustion engine for underwater vessels having provision for the mixture of a fuel and a catalyst activated solid or liquid oxidant within the engine cylinder.

A still further object is to provide a method wherein power loss by dissipation of heat developed by the combustion of a mixture of fuel and a liquid or solid oxidant in an internal combustion engine is substantially reduced.

Other objects and many of the attendant advantages of this invention will be readily appreciated as the same becomes better understood by reference to the following detailed description when considered in connection with the accompanying drawings wherein:

Fig. 1 is a view in diagrammatic form of a preferred arrangement of the present invention; and Fig. 2 is a diagram of a cycle of operations of the engine of the present invention.

Referring more particularly to the drawing wherein like numerals indicate like parts throughout the several views an internal combustion engine is indicated at 10 and having an intage valve 11, injection valve 12 and an exhaust valve 13.

As indicated in the diagram there is provided a tank 14 containing, for example, a hydrocarbon fuel and having a conduit 15 connected to port 12. Interposed between tank 14 and port 12 is a pump 16. Pump 16 is for the purpose of forcing the fuel under pressure into the combustion chamber of engine 10.

A second tank 17 containing hydrogen peroxide ($H_2O_2$) is connected by a conduit 18 to port 11 of engine 10. Interposed between tank 17 and port 11 is a pump 19 and a decomposition chamber 21.

The pump 19 is provided to supply under pressure an oxidant such, for example, as hydrogen peroxide to the decomposition chamber 21 and ultimately to the combustion chamber of engine 10.

Decomposition chamber 21 contains a catalyst suitable for the purpose such, for example, as silver, platinum, lead, potassium permanganate or other suitable means such as the application of heat and pressure in order that decomposition of the hydrogen peroxide may be facilitated. In chamber 21 the hydrogen peroxide is converted into an oxidant comprising high temperature steam and oxygen.

Engine 10 is, of course, provided with the conventional intake and exhaust valves 11 and 13 for the oxidant and exhaust gases respectively, and the injection valve 12 for the fuel.

In operation, fuel is pumped from tank 14 into the engine cylinder, the injection valve therefor being open and the piston being at, or near top dead center. Simultaneously therewith, hydrogen peroxide is pumped from tank 17 into chamber 21 where the catalyst or other means activates decomposition of the hydrogen peroxide, the products of decomposition (high temperature steam and oxygen) are injected under pressure into the engine cylinder, the injection valve therefor being open and the operation beginning slightly prior to top dead center. The mixture of fuel, high temperature steam, and oxygen is ignited by the heat developed by decomposition of the oxidant. Burning of the mixture occurs at constant pressure as indicated by the line C—D Fig. 2 or at some combination of constant pressure and constant volume as indicated by the dashed line between C and D. At point D the oxidant and fuel injection valves close and the burning gases expand forcing the piston to bottom dead center. At point E and before bottom dead center, the exhaust valve opens permitting the escape of the burned gases and causing pressure in the cylinder to drop to the ambient pressure as at A. During the period between A and B the residual gases are exhausted through the exhaust valve by means of the upward movement of the piston leaving only the clearance gases in the cylinder when the piston is again at top dead center.

From the foregoing description it is apparent that there has been provided a method of supporting combustion in an internal combustion engine, which is well adapted for use in a torpedo or other underwater vessel, by employing a liquid oxidant, namely, hydrogen peroxide, which may be stored in a relatively small space in contradistinction to a gas such as compressed air which requires a large space for storage of an amount having equal effectiveness.

It is also apparent that such an engine will operate at high efficiency for the reason that combustion of the mixture takes place entirely within the cylinder of the engine and not in an auxiliary combustion chamber as in prior art devices.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. The method of operating an internal combustion engine having a cylinder and piston reciprocable therein which comprises the steps of injecting a fuel into said cylinder, raising the temperature of an oxidant to a temperature above the ignition temperature of the fuel by the exothermic decomposition of the oxidant with a catalyst externally of the engine, and injecting only the decomposition products into said cylinder at said second named temperature to initiate combustion of the fuel within said cylinder simultaneously with the injection of said fuel.

2. The method of operating an internal combustion engine having a cylinder and piston reciprocable therein comprising the steps of injecting a quantity of fuel into said cylinder, decomposing a quantity of hydrogen peroxide externally of the engine by a metal catalyst and solely thereby forming high temperature steam and oxygen at a temperature above the ignition temperature of the fuel, and injecting only said steam and oxygen at said high temperature into said engine whereby said fuel and steam and oxygen are mixed within the engine, combustion of the fuel resulting from the high temperature of the steam and oxygen.

References Cited in the file of this patent

UNITED STATES PATENTS

| | | |
|---|---|---|
| 1,154,609 | Bruniquel | Sept. 28, 1915 |
| 2,398,201 | Young et al. | May 6, 1943 |
| 2,434,298 | Traux | Jan. 13, 1948 |
| 2,445,856 | Mayer | July 27, 1948 |

FOREIGN PATENTS

| | | |
|---|---|---|
| 248,547 | Germany | June 25, 1912 |

OTHER REFERENCES

Publication: "Power Plant Engineering," January, 1947, pages 78 and 79.